(12) United States Patent
Carson et al.

(10) Patent No.: US 8,012,313 B2
(45) Date of Patent: Sep. 6, 2011

(54) DRYING PROCESS AND APPARATUS

(75) Inventors: James Kenneth Carson, Hamilton (NZ); Harold Keith Hill, Hamilton (NZ); Donald Michael Graham, Hamilton (NZ); Grant Brian Schou, Napier (NZ)

(73) Assignee: Agresearch Limited, Hamilton (NZ)

( * ) Notice: Subject to any disclaimer, the term of this patent is extended or adjusted under 35 U.S.C. 154(b) by 987 days.

(21) Appl. No.: 11/579,207

(22) PCT Filed: May 2, 2005

(86) PCT No.: PCT/NZ2005/000089
§ 371 (c)(1),
(2), (4) Date: Sep. 11, 2007

(87) PCT Pub. No.: WO2005/105253
PCT Pub. Date: Nov. 10, 2005

(65) Prior Publication Data
US 2008/0142166 A1    Jun. 19, 2008

(30) Foreign Application Priority Data

May 1, 2004  (NZ) .................................. 529594
May 1, 2004  (NZ) .................................. 529595

(51) Int. Cl.
*B01D 1/18*     (2006.01)
*B01D 1/20*     (2006.01)
*B01D 9/04*     (2006.01)
*B01D 3/42*     (2006.01)
*F26B 5/06*     (2006.01)
*F26B 17/10*    (2006.01)

(52) U.S. Cl. ......... 203/48; 23/293 A; 23/294 R; 34/236; 34/287; 426/384

(58) Field of Classification Search ................. 23/293 A, 23/294 R; 34/92, 236, 282, 287, 576; 62/238.5; 159/3, 42, 44, 45, 48.1, DIG. 16; 202/160, 202/185.5, 185.6, 205, 236; 203/1, 2, 48, 203/86, 90, 91; 426/384, 594, 599
See application file for complete search history.

(56) References Cited

U.S. PATENT DOCUMENTS
3,218,728 A * 11/1965 Barth et al. ..................... 34/292
(Continued)

FOREIGN PATENT DOCUMENTS
CA        1075186         4/1980
(Continued)

OTHER PUBLICATIONS

European Search Report dated Jan. 14, 2009, issued in European Patent Application No. 05747703.

*Primary Examiner* — Virginia Manoharan
(74) *Attorney, Agent, or Firm* — Knobbe Martens Olson & Bear, LLP

(57) ABSTRACT

This technology relates to a process and associated apparatus for use in spray freeze drying a fluid substance such as fruit juice, pharmaceuticals, nutraceuticals, tea and coffee. The method includes the steps of: holding a chamber at a temperature and pressure below the triple-point of the liquid substance; injecting and/or atomizing the liquid substance into the chamber through at least one injection port to generate a frozen liquid substance portion having a predetermined particle size and a first evaporated liquid substance portion; collecting the FLS portion as a layer on a conveying surface; and exposing the collected layer of FLS portion to a heating means thereby inducing sublimation and generation of a second evaporated liquid substance portion and a product, wherein the conveying surface conveys the collected FLS portion at a rate which achieves substantially a monolayer thickness of the FLS portion to accumulate on the conveying surface.

18 Claims, 4 Drawing Sheets

U.S. PATENT DOCUMENTS

| | | | |
|---|---|---|---|
| 3,563,099 A | | 2/1971 | Rader |
| 3,601,901 A | | 8/1971 | Rader |
| 3,620,776 A | * | 11/1971 | Abraham et al. ............... 34/288 |
| 3,672,911 A | * | 6/1972 | Smith, Jr. ....................... 426/385 |
| 3,740,860 A | * | 6/1973 | Smith, Jr. ......................... 34/289 |
| 3,909,957 A | * | 10/1975 | Passey .............................. 34/92 |
| 4,033,048 A | | 7/1977 | Van Ike |
| 4,204,336 A | | 5/1980 | Viet |
| 4,810,274 A | | 3/1989 | Cheng et al. |
| 2004/0154317 A1 | | 8/2004 | Shekunov et al. |

FOREIGN PATENT DOCUMENTS

| | | |
|---|---|---|
| JP | 63-269969 A | 11/1988 |
| JP | 2004-012015 A | 1/2004 |
| JP | 2004-232883 A | 8/2004 |
| SU | 0848932 A1 | 7/1981 |

* cited by examiner

DRYING PROCESS AND APPARATUS

RELATED APPLICATIONS

This application is a U.S. National Phase of International Application No. PCT/NZ2005/000089, filed May 2, 2005, designating the U.S. and published on Nov. 10, 2005 as WO 2005/105253, which claims priority to New Zealand Patent Application No. 529594, filed May 1, 2004 and to New Zealand Patent Application No. 525595, filed May 1, 2004. The content of these applications is incorporated herein by reference in its entirety.

TECHNICAL FIELD

This invention relates to a dryer and a drying process. In particular, though not solely, this invention relates to a dryer for use in freezing, concentrating or drying a liquid substance having solid particles in suspension or a substance dissolved therein.

BACKGROUND ART

The process of food preservation has always been of interest, with freeze drying being of particular food industry focus since the late 1940's. In the formative years of freeze drying apparatus and processing development, there was an emphasis in achieving a useful (preserved) end product. The basic stages of freezing a liquid material and then heating the frozen material under vacuum to effect moisture removal are preferable to earlier attempts at food preservation which often involved dehydration by hot air convection methods.

Dried product quality is of prime importance in terms of nutritional value and appearance to the consumer. It is undesirable to damage the product during the processing and removal of liquids from substances. Hot air convection drying often results in product shrinkage and other detrimental effects.

Batch unit operations have been used in the freeze drying industry although batch processing has a number of disadvantages which include; longer product processing durations, longer residence times at each stage of processing (often as manual labour is required to transfer partially processed substances from one stage to the next), poorly optimised processing equipment often with excess capacity, increased set-up times, reduced control of the process due to increased likelihood of human error (due to lack of automation), and low throughput. Batch systems are typically used for small production runs or where a need for process flexibility is required.

In conventional (batch freeze) drying processes at least one liquid feed is poured into shallow tray(s) (product thickness typically varies between 10 and 20 mm), which are then placed on shelves in the freeze dryer. The door to the batch freezer is closed and the product is frozen. After the product has frozen, the trays are heated and the ice is slowly sublimed. The sublimed vapour is condensed on refrigerated coils. Once it is assumed that the product is dry, the product is removed manually. The product exits a conventional freeze-dryer as a brittle cake, and usually requires a separate granulation stage before it can be further processed.

This method of drying a moisture laden substance by freezing it then subliming off as much excess moisture as possible to produce a dried product is primarily used within industries where substances need to be dried, but are unable to withstand even moderate temperatures, for example some foodstuffs or pharmaceuticals can be damaged or affected by heat.

It is not unusual for this combined freezing and drying process to take 48 hours or more. This is undesirable if heat-sensitive materials are being dried. Also, if the vacuum is lost in a conventional batch freeze-dryer, melting and glass formation may occur, and it is possible that the entire load of product may be lost, that is the product may not be a useable quality product or able to be sold. In addition, the loading and unloading process is susceptible to product contamination due to exposure, and wastage from spillage of the shallow trays.

Therefore, a system which enables rapid freeze drying of a moisture laden substance and which produces a suitably formed end product, such as a powder, is desirable. As yet no truly continuous or semi-continuous freeze drying processes have been effectively developed by the drying industry.

An apparatus able to minimise potential contamination, reduce liquid feed spillage and which may increase the liquid throughput would be advantageous to the drying industry. If a liquid feed is able to be freeze dried which does also not require a necessary pre-treatment liquid feed cooling stages or subsequent dried product granulation stages, then significant problems with conventional batch freeze drying may be overcome.

In more recent times, the stages of freezing and drying have been further developed to include various steps such as reducing the physical size of substances to be treated, as well as graded temperature control during the freezing and drying stages. However, In practice highly controlled drying has often been difficult to implement effectively as the substances being dried are often in static tray type arrangements and therefore some substance is likely to be affected or heated more so than other parts of the substance, therefore resulting in over-dried or overheated and consequently damaged product. It would therefore be advantageous to utilise a drying stage with the provision of improved heat transfer conditions to substances, such a stage being preferably coupled to a freeze dry process.

It is therefore an object of the present invention to provide a dryer apparatus and/or a drying process or method which goes at least some way towards addressing the foregoing problems or to at least to provide the industry with a useful choice.

All references, including any patents or patent applications cited in this specification are hereby incorporated by reference. No admission is made, that any reference constitutes prior art. The discussion of the references states what their authors assert, and the applicants reserve the right to challenge the accuracy and pertinence of the cited documents. It will be clearly understood that, although a number of prior art publications are referred to herein, this reference does not constitute an admission that any of these documents form part of the common general knowledge in the art, in New Zealand or in any other country.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

Further aspects and advantages of the present invention will become apparent from the ensuing description which is given by way of example only.

DISCLOSURE OF INVENTION

Accordingly, in a first aspect, the invention broadly consists of a method of drying or concentrating a liquid substance having solid particles in suspension or a substance dissolved therein comprising the steps:
  holding a chamber at a temperature and pressure below the triple-point of the liquid substance,
  injecting and/or atomising the liquid substance into the chamber to generate a frozen liquid substance portion ("FLS portion") and a first evaporated liquid substance portion ("FEL portion"),
  collecting the FLS portion as a layer on a surface, and conveying the collected FLS portion on the surface,
  wherein the surface conveys the collected FLS portion at a rate which controls the thickness of the layer of collected FLS on the surface.

A "liquid substance" is used herein and refers to a substance which has liquid flow-like properties, but has constant weight/mass in a first state. The weight/mass of the liquid substance can be altered by removing components from the liquid substance, for example by evaporating liquids from the substance, leaving a more concentrated liquid substance. Such liquid substances may include liquids having particles or solids suspended or dissolved in a solution, as well as compounds which can exist in a liquid state, such as or similar to water or oil.

Preferably, the rate of conveying achieves substantially a monolayer thickness of FLS portion to accumulate on said surface.

Preferably, the FEL is condensed by a condensing device.

Preferably, the FEL is removed from said chamber.

Preferably, injecting and/or atomising the liquid substance includes spraying to achieve a pre-determined particle size of FLS.

Preferably, injecting and/or atomising of the liquid substance is performed by one or more nozzles.

Preferably, the rate of conveyance of FLS upon said surface achieves substantially a monolayer thickness of the FLS upon said surface.

Preferably, the monolayer may be the thickness of a single layer of the pre-determined particle size of the FLS portion.

Preferably, the predetermined particle size is substantially 500 μm or more.

Preferably, the predetermined particle size is less than substantially 500 μm.

Preferably, the predetermined particle size is less than substantially 200 μM.

Preferably, the surface conveys the FLS portion away from the one or more nozzles.

Preferably, the method includes the step of exposing the collected layer of FLS portion to a heating means thereby substantially inducing sublimation and generation of a second evaporated liquid substance portion ("SEL portion") and a product.

Preferably, the SEL portion is condensed by a condensing device.

Preferably, the SEL portion is removed from the chamber.

Preferably, the product is removed from the conveying surface by a product removal device.

Preferably, the product is removed from the chamber via the outlet port.

Preferably, the method is used to process a fluidised substance, or a liquid substance having solid particles in suspension or a substance dissolved therein.

Preferably, the substance is selected from one or more of the following: a slurry of coffee, liquid milk, fruit and/or vegetable juices.

In a second aspect, the Invention broadly consists of an apparatus for drying or concentrating a liquid substance comprising:
  a chamber and a chamber pressure reduction device, and
  one or more injection ports through which the liquid substance is injected to the chamber,
  a collection surface which collects a frozen liquid substance portion of the liquid substance,
  wherein the pressure reduction device maintains the chamber at a pressure below at least the triple-point pressure of the liquid substance, to cause the injected liquid substance to separate into a frozen liquid substance portion ("FLS portion") and a first evaporated liquid substance portion ("FEL portion"),
  so that in use, the FLS portion is accumulated as a layer on the collecting surface and conveyed away from the one or more injection ports at a rate which allows the thickness of the layer of the FLS portion to be controlled.

Preferably, the rate of conveyance achieves substantially a monolayer thickness of FLS portion to accumulate on said surface.

Preferably, the FEL portion is condensed by a condensing device.

Preferably, said FEL is removed from said chamber.

Preferably, the one or more Injection ports comprises at least one spray or atomisation nozzle.

Preferably, the nozzle or nozzles substantially determine the size of the FLS portion generated to achieve a pre-determined particle size.

Preferably, the pressure reduction device is a gas evacuation pump.

Preferably, the condensing device is a cooled coil or coils.

Preferably, the condensing device is cooled with a refrigerant.

Preferably, the collection surface includes one, or a combination of, the following conveyors: a moving endless belt configuration, a tray angled to encourage the frozen liquid substance portion to slide away from the one or more injection ports, a vibrating tray.

Preferably, the angled tray and/or vibrating tray includes a reduced friction surface.

Preferably, the reduced friction surface comprises polytetrafluroethylene (PTE.

Preferably, the layer of FLS portion upon said collection surface is exposed to a heating means as it is conveyed away from the one or more injection ports.

Preferably, the heating means substantially induces sublimation of the FLS portion layer upon said surface to form a second evaporated liquid ("SEL") substance portion and a product.

Preferably, the heating means is one or a combination of the following energy sources: infra-red lamps, halogen lamps, incandescent lamps, microwaves, or ohmic heating of said surface.

Preferably, a product removal device is employed to remove the product from the collection surface.

Preferably, the product removal device is a scraping means and/or a brushing means.

Preferably, the scraping means substantially contacts the surface with the product thereon and moves the product off the surface to the outlet port.

Preferably, the brushing means is a rotating brush or fixed brush which substantially contacts the surface with the product thereon and channels the product off the surface to the outlet port.

Preferably, the product is removed via a chamber outlet port.

Preferably, the chamber is held at a pressure of substantially 611.3 Pa or less.

In a third aspect, the invention broadly consists of a drying process for a liquid substance comprising the steps of:
  atomising the liquid substance,
  cooling the atomised liquid substance (ALS) to initiate a phase change,
  conveying the ALS into a drying chamber under a vacuum,
  heating the ALS so as to substantially effect sublimation and then collecting the substantially dried ALS from the chamber.

Preferably, the liquid substance is chilled from an Initial temperature prior to atomising.

Preferably, the ALS conveyed into the drying chamber is also conveyed through the drying chamber.

Preferably, the ALS is heated via a temperature gradient while it travels through the drying chamber so that the temperature gradient substantially effects sublimation.

Preferably, the step of chilling a liquid substance takes place in a chiller to reduce the liquid substance from an initial temperature to a lower temperature.

Preferably, atomising the liquid substance achieves a predetermined particle size.

Preferably, the predetermined particle size is substantially 500 μm or more.

Preferably, the predetermined particle size is less than substantially 500 μm.

Preferably, the predetermined particle size is less than substantially 200 μm.

Preferably, a spray freezer utilises a cold gas to effect a phase change of the liquids in the atomised liquid substance (ALS).

Preferably, chilling is undertaken with direct or indirect contact with a cold fluid.

Preferably, said cold fluid is air.

Preferably, said cold fluid is substantially 0° C. or less.

Preferably, said cold fluid is less than substantially −20° C.

Preferably, said spray freezer operates in a counter current configuration.

Preferably, said spray freezer operates in a co-current configuration.

Preferably, the ALS is reduced to a temperature below its eutectic temperature.

Preferably, the ALS is conveyed to a separator.

Preferably, said ALS is conveyed pneumatically to a separator.

Preferably, said separator is a gas-solid separation device.

Preferably, said gas-solid separation device is a cyclone.

Preferably, the gas separated in the gas-solid separation device is returned and/or refrigerated for use in the chilling step.

Preferably, one or more vacuum and/or air locks are present between a AFS cyclone outlet and a drying chamber inlet.

Preferably, separated solids from said gas-solid separation device enter a vacuumous drying chamber.

Preferably, the vacuum of said vacuumous drying chamber is created by a pressure reduction device.

Preferably, the vacuum created by the pressure reduction device is substantially 600 micro meters Hg absolute pressure or less.

Preferably, the vacuum created by the pressure reduction device is in the range of substantially 200-400 micro meters Hg absolute pressure.

Preferably, said ALS is conveyed via a surface.

Preferably, said ALS is conveyed via a vibrating surface.

Preferably, said vibrating surface is a vibrating tray.

Preferably, said vibrating tray is pneumatically and/or mechanically and/or electrically and/or magnetically driven.

Preferably, said vibrating tray conveys ALS through a temperature gradient to substantially effect sublimation.

Preferably, a vapour produced by sublimation is removed from the drying chamber.

Preferably, vapour produced by sublimation is removed from the drying chamber by one or more condensers.

Preferably, the ALS is heated via a temperature gradient while it travels through the drying chamber so that the temperature gradient substantially effects sublimation.

Preferably, said temperature gradient is provided by an energy source.

Preferably, said energy source is an infra-red emitting device and/or a micro-wave emitting device and/or an ohmic heater.

Preferably, atomising the liquid substance achieves a predetermined particle size.

Preferably, the predetermined particle size is substantially 500 μm or more.

Preferably, the predetermined particle size is less than substantially 500 μm.

Preferably, the predetermined particle size is less than substantially 200 μm.

Preferably, a refrigeration system is employed to maintain ALS at a temperature below its eutectic temperature during transport from the gas-solid separation device to the vacuumous drying chamber.

Preferably, a product produced is substantially reduced is free of liquid compared to the liquid substance.

In a fourth aspect, the invention broadly consists of an apparatus for a drying process for a liquid substance comprising:
  an atomiser capable of atomising a liquid substance, a cooler capable of cooling the atomised liquid substance (ALS) to initiate a phase change,
  a conveyor capable of conveying the ALS into a drying chamber held under a vacuum,
  an energy source capable of heating the ALS so as to effect sublimation and freeze drying, and
  a collector capable of collecting the dried ALS.

Preferably, a chiller capable of chilling a liquid substance from an initial temperature to a lower temperature is provided prior to the liquid substance atomiser.

Preferably, the apparatus includes a conveyor capable of conveying the ALS through the drying chamber.

Preferably, the apparatus includes an energy source capable of heating the ALS via a temperature gradient while it travels through the drying chamber so that the temperature gradient can effect sublimation.

Preferably, the temperature gradient substantially prevents or substantially minimises heat damage occurring to the ALS as it passes through the chamber.

Preferably, atomising the liquid substance achieves a predetermined particle size.

Preferably, the predetermined particle size is substantially 500 μm or more.

Preferably, the predetermined particle size is less than substantially 500 μm.

Preferably, the predetermined size is less than substantially 200 μm.

Preferably, a spray freezer utilises a cold gas to effect a phase change of the liquids in the atomised liquid substance (ALS).

Preferably, said cold gas is air.

Preferably, said cold gas is substantially 0° C. or less.

Preferably, said cold gas is less than substantially −20° C.

Preferably, the vacuum of said vacuumous drying chamber is created by a pressure reduction device.

Preferably, the vacuum created by the pressure reduction device is substantially 600 micro meters Hg absolute pressure or less.

Preferably, the vacuum created by the pressure reduction device is in the range of substantially 200-400 micro meters Hg absolute pressure.

Preferably, said ALS is conveyed via a vibrating surface.

Preferably, said vibrating surface is a vibrating tray.

Preferably, said vibrating tray is pneumatically and/or mechanically and/or electrically and/or magnetically driven.

Preferably, ALS is conveyed through a temperature gradient to substantially effect sublimation.

Preferably, vapour produced by sublimation is removed from the drying chamber by one or more condensers.

Preferably, said temperature gradient is provided by an energy source.

Preferably, said energy source is an infra-red emitting device and/or a micro-wave emitting device and/or an ohmic heater.

In a fifth aspect, the invention broadly consists of a drying chamber which comprises;

a device capable of vibrating a tray, a suitable device for reducing the pressure in said chamber, a material outlet port from said chamber, and a heat source adapted to act upon said tray.

Advantageously, the present invention provides an improved method/process of treating a liquid substance to form a dryer or at least more concentrated form of the liquid substance (in the form of a 'product).

In preferred embodiments, the present invention is able to be operated on a semi-continuous basis, or at least which will allow a greater throughput of liquid substance than compared with prior art drying systems. The rate of conveyance of atomised liquid substance (ALS) is sufficient to increase efficiencies of drying/concentrating and/or which helps to reduce damage to the product.

BRIEF DESCRIPTION OF DRAWINGS

Further aspects of the present invention will become apparent from the following description which is given by way of example only and with reference to the accompanying drawings in which.

BEST MODES FOR CARRYING OUT THE INVENTION

Figure 1:
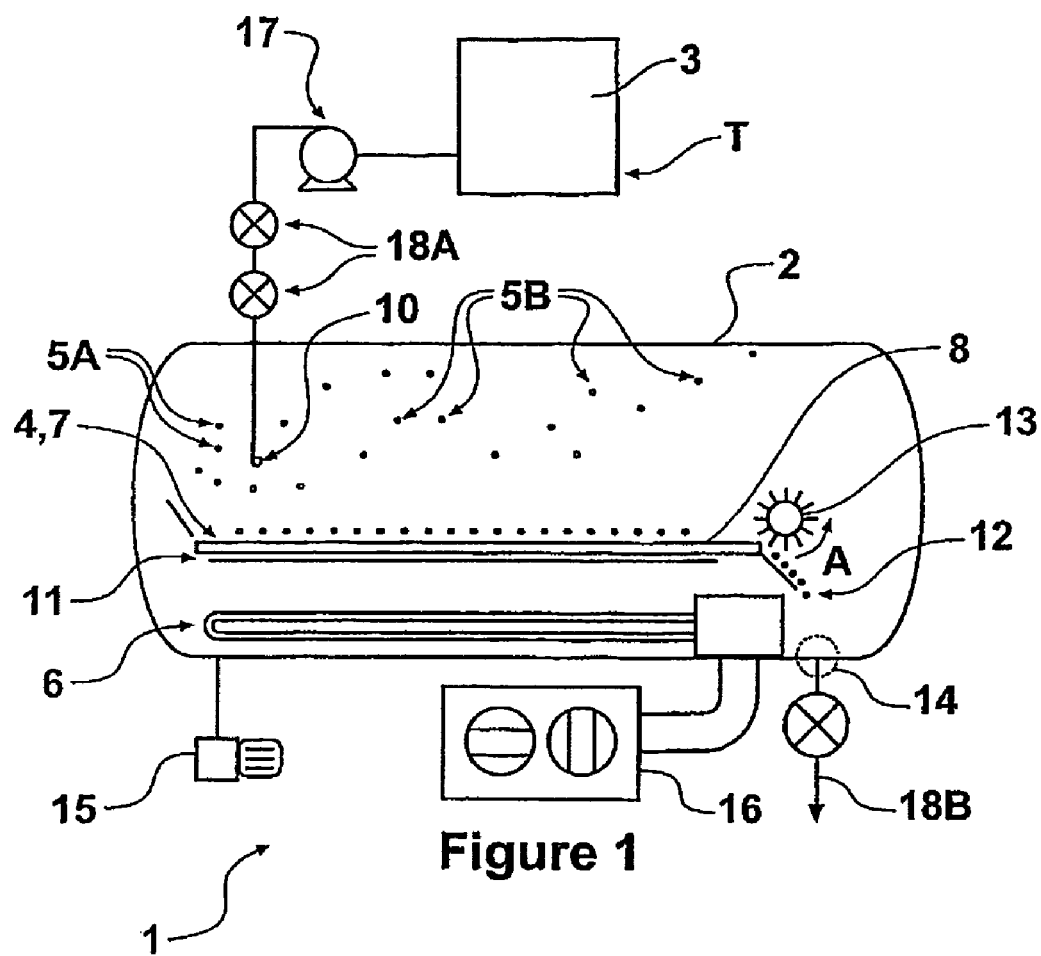
FIG. 1 illustrates one embodiment of a possible dryer configuration according to the present invention in the third and fourth aspects.
Figure 2:
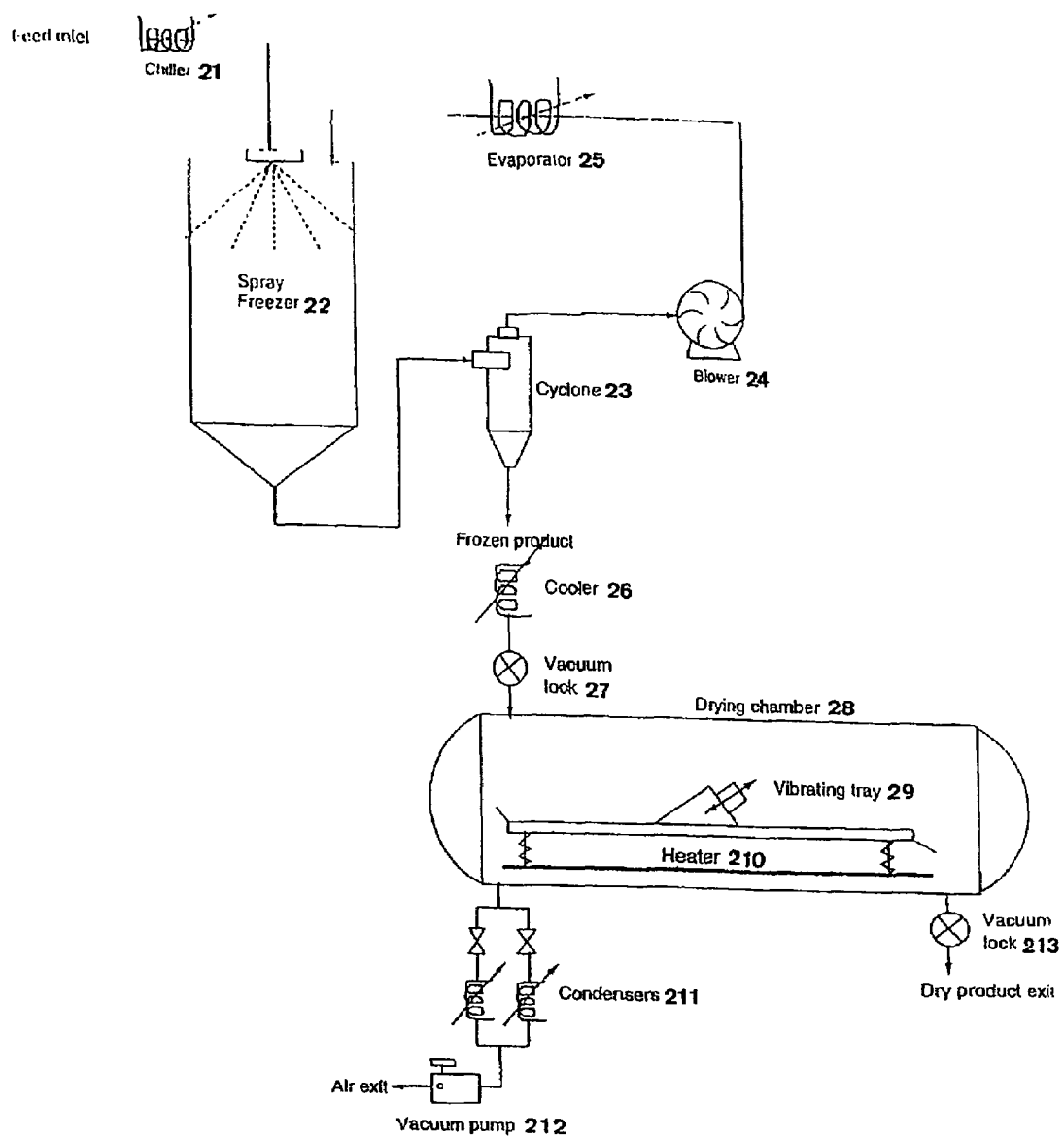
FIG. 2 is a process flow diagram of one possible embodiment of the present invention according to the first and second aspects.
Figure 3:
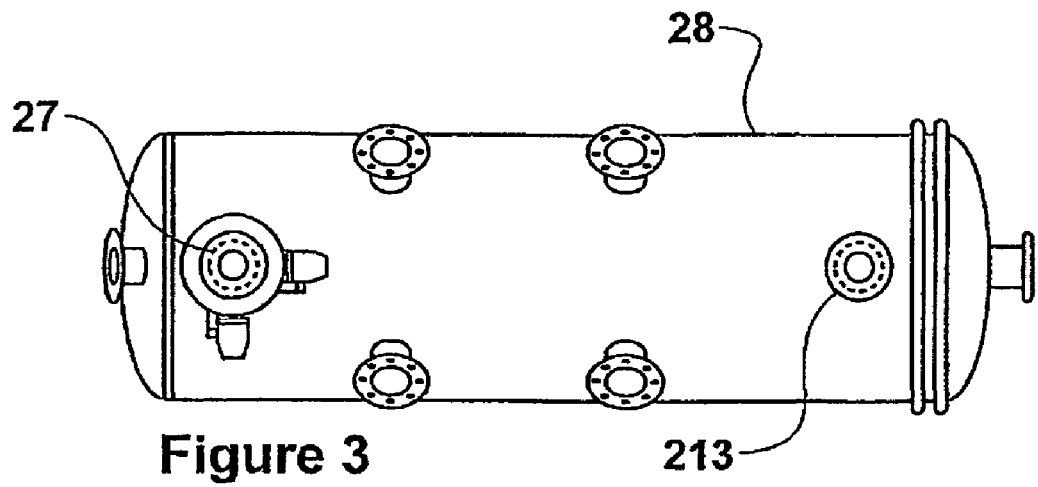
FIG. 3 is a top view of the drying chamber configuration shown in FIG. 2.
Figure 4:
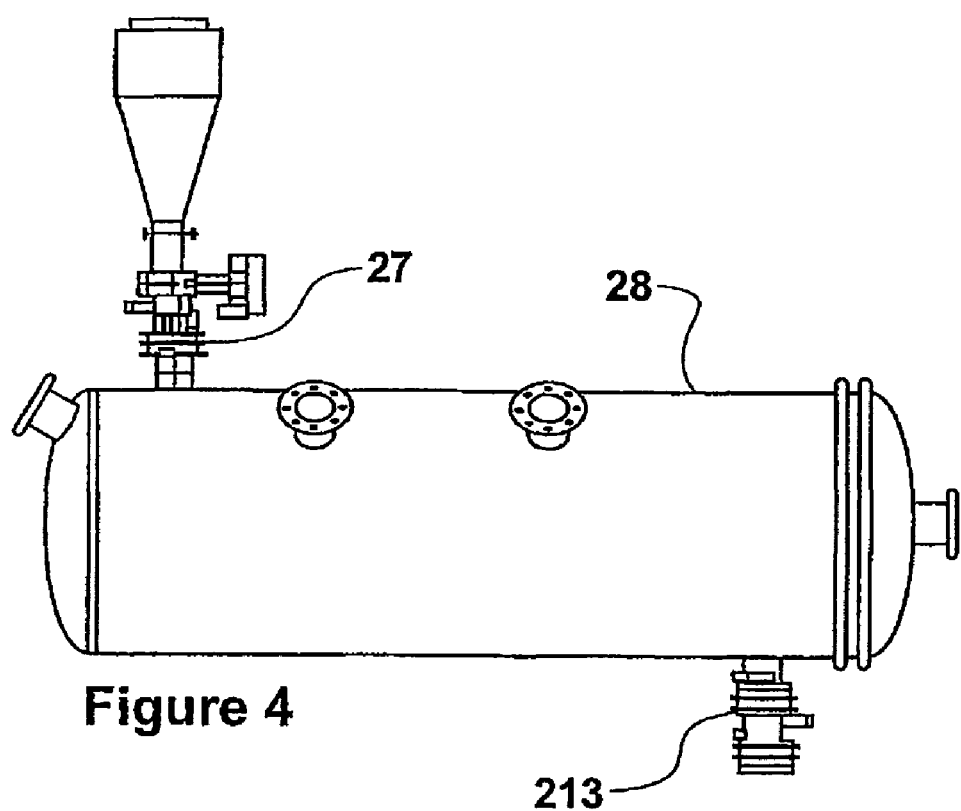
FIG. 4 is a side view of the drying chamber configuration shown in FIGS. 2 and 3.
Figure 5:
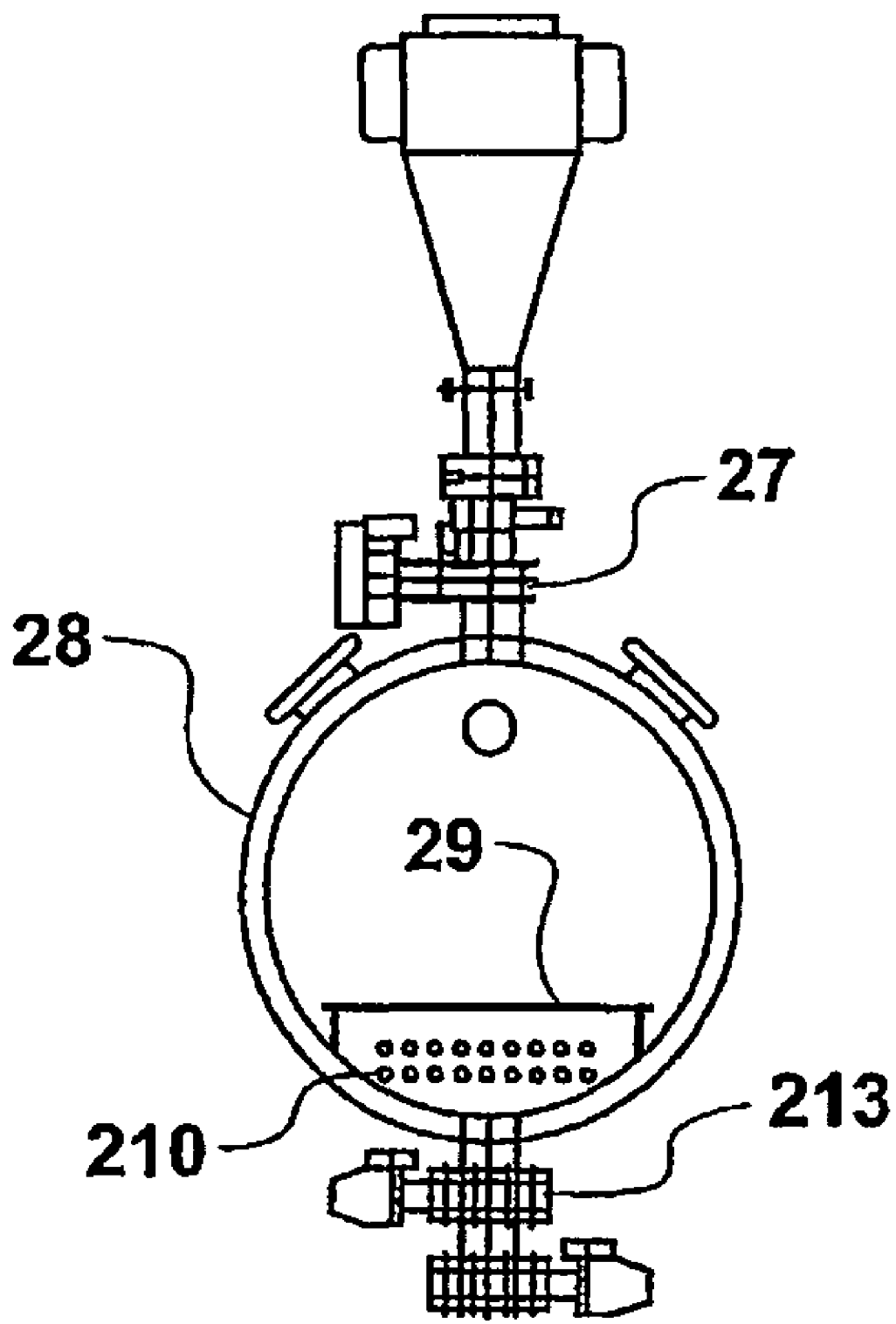
FIG. 5 is an end view of the drying chamber configuration shown in FIGS. 2 to 4.

The present invention may now be described with reference to FIGS. 1 to 5, and the accompanying description below.

The present invention relates to process for freeze drying or dehydrating/concentrating liquid substances. The process is applicable to liquids having a solid substance in suspension (for example milk) or to liquid solutions in which a substance has been dissolved. Tea, coffee, fruit juice, pharmaceuticals and nutraceuticals could also be processed using this spray freeze dryer.

Freeze drying is a useful preservation technique and among many other products, the following may be dried in this manner; instant coffee, vegetables for dried soup mixes, mushrooms, herbs, spices, cheese starter cultures, shrimp, fruits for ready-to-eat breakfast cereals, nutraceuticals, pharmaceuticals and agriceuticals.

Some specific end users of freeze dried products may Include the production of military and/or space rations as well as light weight camping foods containing vegetables, meat, fish, and fruits. The freeze drying process may generally have the following advantages; low thermal damage, good retention of volatile flavours, good vitamin retention, rapid product rehydration, low product shrinkage, long product storage life—if suitably packed, retention of biological activity. Although there are also some disadvantages associated with freeze drying substances may be most notably; high drying cost, damage to certain products by initial freezing, rapid deterioration unless packed and maintained at low humidity, friability (i.e. crumbles easily), pre-treatment sometimes necessary (e.g. carrots) to avoid colour loss.

A process 1 as generally outlined in the third aspect, and apparatus as broadly defined by the fourth aspect described above, comprises holding a chamber 2 at a temperature and pressure below the triple-point of a liquid substance 3, injecting the liquid substance 3 into the chamber 2 thereby generating a frozen liquid substance portion 4 and a first evaporated liquid substance portion 5A.

The first evaporated liquid substance portion 5A may be condensed by condensing means 6, whilst at the same time collecting the frozen liquid substance portion 4 as a layer 7 on a collection surface 8.

The frozen liquid substance portion 4 collected as the layer 6 is conveyed along the collection surface 8. The surface 8 conveys the frozen liquid substance portion layer 7 at a rate which controls the thickness of the layer of collected frozen liquid substance portion collected.

The condensed first evaporated liquid substance portion may be removed from the chamber 2. In order for any water or evaporated liquid substance portion to be removed from the gaseous phase in the chamber, it can be condensed on the coils. In order for evaporated portion to be removed from the condensing coils, the coils can be returned to pressures above the triple point so that the ice will melt. Therefore, in order to achieve substantially continuous or quasi-continuous operation two or more sets of condensation coils may be used; while one is frosting up, the other or remaining coils may be isolated from the drying chamber by closing a pressure seal of some sort, returning to ambient pressure, and defrosted.

Liquid substance 3 in a holding tank T may be sprayed into the chamber 2 in order to achieve a predetermined size of frozen liquid substance portion particles, and this may be performed by one or more nozzles 10.

Thickness of the frozen liquid substance portion (particles) collected on the collection surface is determined by the rate (metres per second) of conveyance by the collection surface 8 which is in form of an endless conveyor (not shown). The thickness of this monolayer of particles will also be determined by the particle sizes generated by injection of the liquid substance into the chamber and/or of liquid substance Injection by the nozzle(s) 10.

Desirably the surface conveys the frozen liquid substance portion away from the point of liquid substance injection, or the position of the one or more nozzles, at a rate which substantially achieves about the monolayer thickness of frozen liquid substance portion upon the collection surface 8.

The collected frozen liquid substance portion can then be exposed to a heating means 11 which may induce at least some sublimation and thereby generation of a second evaporated liquid substance portion 5B and a product 12.

The second evaporated liquid substance portion 5B can also be condensed by the condensing means 6 and removed from the chamber 2.

The product 12 (in a state advantageously containing less liquid than at the holding tank, T, state) may be removed from the collection surface 8 by a product removal means 13 then evacuated from the chamber 2 via the outlet port 14.

In a further embodiment of the process substantially as described above, an apparatus may be configured to generate a product 12 which is drier or more concentrated, than that of the liquid substance 3 in the holding tank, T.

A chamber 2 is hold at a pressure at least below the triple-point pressure of the liquid substance by a pressure reduction means, such as a gas evacuation pump 15.

One or more injection ports, such as nozzles 10, may be employed through which the liquid substance 3 can be sprayed. Upon Injection (or spaying) of the liquid substance 3 into the chamber 2, a frozen liquid substance portion 4 and a first evaporated liquid substance portion 5A may be generated.

A collection surface 8 is provided to substantially collect the generated frozen liquid substance portion 4 of the liquid substance 3.

A condensing means 6 may be employed to condense the first evaporated liquid substance portion 5A, and the condensate may be subsequently drained and removed from the chamber 2.

An outlet port 14 from the chamber may be used to evacuate a drier or more concentrate form of the liquid substance 3, in the form of a product 12.

The frozen liquid substance portion 4 can be accumulated as a layer 7 on the collecting surface and conveyed away from the one or more injection ports, towards the outlet port, at a rate which allows the accumulation of not more than substantially a monolayer thickness of frozen liquid substance portion.

The first evaporated liquid substance portion 5A can be condensed by the condensing means 6 and removed from the chamber. The condensing means 6 is a cooled condensation coil or coils. The condensing means is cooled with a refrigerant, supplied from the refrigeration unit 16.

The one or more injection ports comprise a spray or an atomisation nozzle or nozzles. The nozzle or nozzles substantially determine the size of the frozen liquid substance portion generated.

The collection surface includes one or a combination of the following conveyors: a moving endless belt configuration, a tray angled to encourage the frozen liquid substance portion to slide away from the one or more injection ports, a vibrating tray. The angled tray and/or vibrating tray include a reduced friction surface comprising polytetrafluroethylene.

The layer of frozen liquid substance portion upon said collection surface is exposed to a heating means as it is conveyed away from the one or more injection ports which may substantially induce sublimation of the frozen liquid substance portion layer 7 upon the surface 8 to form a second evaporated liquid substance portion 5B and a product 12.

The heating means is one or a combination of the following energy sources: infra-red lamps, halogen lamps, incandescent lamps, microwaves or ohmic heating of the surface 8 itself which may act directly upon the frozen liquid substance portion 4. The heating means may also operate upon the frozen particles indirectly via heat transfer from the surround internal chamber equipment, such as heat transfer through the collection surface 8, or via radiation or reflection of energy from the surrounding chamber walls A product removal device can be employed to remove the product from the collection surface which may have stuck or adhered to the surface. Such a product removal device may be a scraping means and/or a brushing means.

A scraping means may substantially contact the surface 8 with the product 12 thereon and move the product off the surface toward the outlet port 14, whereas a brushing means may be in the form of a rotating brush or fixed brush which also substantially contacts the surface with the product thereon and moves product toward the outlet port. Once the product is removed from the chamber it may then be packaged or further processed (such as a granulation stage, or vacuum packaging to maintain the quality of the product).

The liquid substance 3 may be supplied under pressure to the injection point 10 via a pump 17, with the liquid substance passing into the depressurized environment of the chamber 2 through a series of valves 18A.

The frozen portion 5A of the sprayed or atomised injected liquid substance 3 is advantageously directed to land and be collected upon a surface 8 which then conveys the frozen portion 4 away from the injection nozzle(s) 10.

The surface 8 may promotes travel of the frozen portion 4 away from the injection nozzle(s) by a either use of or a combination of conveyor surface options. These surface options are provided which allow the surface collected frozen portion 4 to preferably not accumulate to greater than about a monolayer thickness of frozen portion 4. The thickness or layer 7 of the frozen portion 4 upon the surface 8 directly determines the rate of sublimation (drying) during exposure to the heating means 11.

Alternatively, an optimal thickness for rapid sublimation (drying) of the frozen portion may be determined by actively measuring the thickness of the layer on the surface, for example using light reflection techniques. Once the thickness of the layer being sprayed onto the surface is determined, the conveyer rate of removal of particles away from the injection port(s) can be altered to match the liquid substance inlet spray rate, or to optimise the liquid substance throughput (and product production). The spray rate or throughput of liquid substance may also be altered to be sympathetic with the rate of conveying of particles along the surface.

Once the frozen portion 4 is exposed to the heating means 11, sublimation is preferably induced thereby resulting in additional liquid removal from the now frozen liquid substance. The substantially reduced moisture content substance, which may be referred to as the 'product' 12, can then be removed from the conveying surface. The product can then be collected and removed from the chamber 2 via an outlet port 14, which includes one or more valves 18B (or air locks) to prevent loss of chamber vacuum.

As the chamber 2 is held at a vacuum, a vacuum pump 15 is required to obtain desired pressures in the chamber, for example, the triple-point of water is 611.3 Pa (or 4.585 mmHg, or 0.0887 psi). The pressure of the chamber must never be higher than the triple-point pressure of water, however, depending on the product, certain temperature constraints must be met to avoid glass formation and freezing point depression associated with the freeze concentration effects that occur as the product dries. Some products must be kept below their eutectic temperature while for others the glass transition temperature is critical. Since the pressure in the vessel will determine the sublimation temperature and hence the product temperature, often the process will have to operate at pressures significantly below 611.3 Pa, for example, coffee: −21° C. and 94 Pa; fruit juices −30° C. and 38 Pa. Of course, it is recognised that this technology may be applied to most liquid substances containing particles in suspension or a material dissolved therein. A person skilled in the art of thermodynamics would understand the relationship of pressure and temperature, and how the chamber conditions determine the quantity of flash evaporation (generation of the first evaporated liquid substance portion) and resulting temperature of the frozen liquid substance portion formed. The chamber conditions may be varied to optimise the level of throughput and/or level of freezing occurring in the chamber.

As the liquid feed may be fed through a nozzle directly into the vacuum chamber, the nozzle and feed pressure are chosen such that a stable spray-jet is maintained. In a sub-triple point environment, a material cannot exist in the liquid state, meaning that some of the liquid is forced to vaporise almost Instantaneously, causing the remaining liquid to freeze. Since the enthalpy of fusion duty does not need to be supplied by an external energy source, it is effectively "free". In addition, as a result of the same process, approximately one seventh of the sublimation duty is also free. This means that for a given load of product, the spray freeze dryer will require at least 10% less energy than a conventional batch freeze dryer.

The product is frozen into very fine particles, whose maximum size is limited by the surface tension and vapour pressure (typically 100 μm or less). The frozen particles land on a heated tray or belt where it dries as moisture sublimes off and is condensed by the condensing coils as it is conveyed along the length of the dryer. Freeze drying times may be estimated from the following equation (Fellows, 1997):

$$t_d = \frac{x^2 \rho \Delta M \lambda_s}{8 k_d \Delta T}$$

Where: $t_d$=drying time (s), x=product layer thickness (m), $k_d$=thermal conductivity of dry product (W/mK), ρ=bulk density of product (kg/m$^3$), ΔM=change in moisture content (dry basis), ΔT=temperature driving force (° C.) and $\lambda_s$ enthalpy of sublimation (J/kg). This equation shows that the drying time is proportional to the square of the thickness of the layer of the product on the drying surface.

The present invention of the second aspect can be referred to as a spray freeze drying process in a quasi-continuous process, and may be integrated into a continuous production line, which would reduce the labour requirements associated with its operation, and could also eliminate the risk of exposure or product contamination. In addition, the need for a subsequent granulation stage is removed, since the dried product exits the dryer in powdered form.

A polytetrafluroethylene (PTFE) coated surface such as a belt conveying system can be attached to a variable-speed drive, allowing the residence time of the product on the belt to be varied between about 1 and 12 minutes depending on exposure to the heating means required to sublime off a desired amount of moisture. The length of the belt may be about 2 m and the belt speeds may be varied between about 0.17 m/min and 2 m/min. The product can be sprayed through multiple nozzles, for example 4 nozzles in parallel, in order to distribute the product evenly across the width of the belt (which may be about 0.5 m).

It is anticipated that the majority of particle sizes will be in the region of 10 to 100 μm, and therefore, since it is likely that the product will adhere to the surface (or belt) even with the PTFE (polytetrafluroethylene) coating, a removal means such as a knife-edge, or brush or scraping means arrangement can be employed at the end of the conveyer ((or any position along the surface). If the scraper or knife-edge is not effective enough, a PTFE or other type of material brush can also be used to scrape the particles off. The brush arrangement may cause aggregation of the particles, which may or may not be beneficial, depending on the down-stream handling intended for the particular product.

The feed nozzle 10 can protrude directly into the vacuum chamber 2. The pressure within the vacuum chamber 2 is maintained below the triple point pressure of the liquid 3 and therefore as the liquid substance 3 exits the nozzle 10 some of the water is evaporated 5A Instantaneously ("flashed") as a result of the pressure drop below the liquid's triple point pressure. The evaporation process removes substantial amounts of heat from the droplet with the result that the remaining moisture in the product is frozen. Based on the relative magnitudes of the latent heats of vaporization (≈2250%/kg) and fusion (≈333 kJ/kg), 1 gram of evaporated moisture would freeze approximately 6.5 grams of remaining water 4. Remaining moisture in the frozen liquid substance portion 4 may optionally be removed by an subjecting it to a heating means or energy source such as an infra-red, halogen lamp or other energy source 11 within the vacuum chamber.

Potential advantages of this type of arrangement would also include the significant reduction in external energy (electricity) requirement as almost no electricity is required for freezing the product as well as the associated reduction in the tray-heating electricity requirement; and the difficulties associated with the conveyance of the frozen product (caking, compacting, agglomeration, thawing/re-freezing) can be largely be removed.

The spray freeze drier involves less equipment (and therefore a reduced capital cost) due to its mechanically simpler design, and there is the potential to have much greater control of the lateral distribution of the product on the drying tray (because the spray pattern may be controlled whereas before, the frozen product simply dropped onto the tray).

Some of the major advantages of spray-freeze drying over conventional batch freeze drying are the greatly reduced drying times (a matter of seconds compared to a matter of hours); minimises possibility of damage to heat-sensitive materials; about a 10% reduction in energy costs due to the novel freezing process, which is effectively free of cost, and the need for subsequent granulation stage, which is often costly and can result in product loss is substantially removed.

By utilising this quasi-continuous process exposure to contaminants is avoided and the spray freeze dryer is able to be integrated into a continuous production line, and is much less labour intensive than conventional freeze driers.

In further aspects of the present invention as broadly defined by the first, second and/or fifth aspects, there is provided a drying process and apparatus as illustrated by a flow diagram of the improved continuous spray-freeze-drying process is shown in FIGS. 2, 3, 4 and 5. A liquid substance such as coffee (not shown) is chilled from its initial temperature to some lower temperature in a chiller 21. This step is optional. The liquid feed is directed under pressure via a pump (not shown), atomised through a high pressure nozzle (not shown) into a freezing chamber 22. Ideally, the particle size of the atomised liquid substance should be less than substantially 200-300 micron (μm). The feed is introduced into the freezing chamber 22 with a concurrent flow of cold air (−20° C. or less) and atomised and frozen to produce an atomised frozen substance (ALS). The ALS is quickly frozen below its eutectic temperature to prevent melting. The frozen ALS is pneumatically conveyed by the cold air stream to the spray freezer to a separating cyclone 23, where frozen ALS exits the bottom of the cyclone 23 and the outlet air stream exits the top of the cyclone 23. The outlet air stream from the spray freezer must be below the eutectic temperature of the frozen ALS. A fan or blower 24 blows the outlet air stream from the cyclone through a refrigeration system, in this instance an evaporator 25, where the air is cooled back down to its initial temperature before returning to the spray freezing chamber 22.

The frozen product then falls by gravity into a termination chamber (not shown) attached to the bottom of the cyclone. A vacuum or air lock 27 allows the product to pass from the bottom of the cyclone into the drying chamber 28 without interruption to the vacuum inside the drying chamber. The termination chamber and air lock are cooled with cold air from the refrigeration system, in this Instance a cooler 26 to prevent the frozen ALS from melting. The drying chamber is maintained at an absolute pressure of substantially 200-400 micrometers of Hg with a vacuum pump 212. Frozen ALS falls onto an inclined pneumatic vibrating tray 29 which conveys drying product towards the discharge end of the dryer. To effect sublimation and freeze drying, the tray is heated by a radiant and/or conduction heat source 210 placed underneath the tray 29. The surface temperature of the tray is controlled down its length to ensure complete drying without damaging the product (not shown). The dried ALS (product) exits through the discharge vacuum lock 213. Two condensers 211 are required to run the system continuously. One condenser would be operating normally during drying, while the other would be isolated from the drying chamber and would be defrosting.

An improved drying process for a liquid substance, according to the first aspect includes one or more of the steps of chilling the liquid substance from an initial temperature, atomising the liquid substance so that a predetermined particle size is achieved, freezing the atomised liquid substance (ALS) to below its eutectic temperature, conveying the frozen ALS into a drying chamber which is held under a vacuum, heating the frozen ALS so as to effect sublimation and freeze drying and then collecting the dried ALS from the chamber.

A liquid substance may be defined to be any substance containing a liquid. These may for example include, milk, coffee, liquor, pharmaceuticals, nutraceuticals, function food, agriceuticals, or any other substance which has a moisture content. The amount of liquid in a substance need only be minimal to allow over a period of time degradation of the substance, therefore removal of any "free" liquid is desirable.

The conveying of ALS to a drying chamber may be achieved by any suitable conveying methods/apparatus. For example, these may include pneumatic methods, mechanical methods, electrical or gravity assisted conveying methods may also be suitable.

In another embodiment of the first and/or second aspect preferably there is provided an improved drying process for a liquid substance which may include one or more of the steps of chilling the liquid substance from an initial temperature, atomising the liquid substance so that a predetermined particle size is achieved, freezing the atomised liquid substance (ALS) to below its eutectic temperature, conveying the frozen ALS into a drying chamber which is held under a vacuum, conveying the ALS through the drying chamber, and heating the frozen ALS via a temperature gradient while it travels through the drying chamber so that the temperature grading can effect sublimation and drying whilst preventing or minimising any heat damage occurring to the ALS as it passes through the chamber to a collection point of the dried ALS. The step of chilling a liquid substance can take place in a chiller to reduce the liquid substance from an initial temperature to a lower temperature. For example, this may mean that the liquid substance is chilled from ambient conditions and/or a storage condition facility temperature to a lower temperature. This chilling step is optional, however it may assist and reduce the cooling loading required by the spray freezer.

The chilling may be achieved by any suitable method or apparatus that can reduce the temperature of a substance from an initial temperature to a lower temperature. Preferably chilling may be achieved by any suitable heat transfer unit, these may for example be refrigerators, plate heat exchangers, shell and tube heat exchangers, heat pumps, cool air convection apparatus, gas-liquid cooling towards and other such suitable cooling apparatus. The spray freezer is an especially important aspect of the continuous processing configuration in which rapid temperature reduction to below the substance eutectic temperature is desired, as well as atomisation of the liquid substance. Preferably, atomisation of the liquid substance may be induced by a variety of feed devices such as, single-liquid nozzle (pressure type), two-liquid nozzle (pneumatic type), centrifugal (spinning disc), ultrasonic nozzles and various other rotary atomisers and air atomisation techniques may be employed.

The cooling of the ALS may be achieved by the use of a cooler capable of freezing the ALS. Preferably the atomisation and cooling of the liquid substance both take place in a spray freezer.

There are a number of advantages to spray freezing, especially as particulates formed may be produced of specific or predetermined particle sizes and the specification of, or particulate quality, remains substantially constant throughout the entire spray freezer operation. Spray freezer operation is ideally continuous and adaptable for full automatic control, where response times are fast. Spray freezing is a useful application to both heat sensitive and heat resistant substances. However, if is appreciated that semi-continuous processing may also be required.

A phase change occurs in the ALS when the temperature of the ALS is reduced, that is in which liquids become frozen or reduced to below their eutectic temperature (i.e. solids). Liquids may be sublimated from the frozen ALS at a later state in the process once exposed to a temperature gradient and energy source.

Cyclones are one of the main methods used to separate gas-solid phases, and can provide efficient separation. Frozen ALS and gases are separated, with the gas being recycled to chill the liquid substance, and the frozen (solid) ALS being conveyed through the drying chamber. Sublimation is the phase change from frozen liquids (solid) to gas (liquid vapour) for the means of evaporation of liquid from the ALS. Ideally the sublimation and/or drying of the frozen ALS takes place on a surface. More preferably the surface may be a vibrating surface. Even more preferably, the vibrating surface is a vibrating tray in which the vibrations are produced by pneumatic and/or mechanical and/or electrical means. It is advantageous to induce and/or provide some vibration movement of the frozen ALS to be dried to enhance and promote improved heat transfer to the atomised particles.

The sublimation (i.e. drying of the ALS and "free" liquid removal) may be Initiated and effected by the energy emitted from an energy source such as an infrared device, which the vibrating drying tray preferably enhances the heat transfer characteristics to the ALS and allows for a more uniform and controlled drying stage. The energy source capable of heating the ALS may be any suitable energy source for inducing sublimation of the frozen liquids of the ALS. Such suitable energy sources may for example include; infra-red emitting devices, microwaves, radiant heaters, convection heaters, and any device which provides enough energy to the ALS to induce sublimation of the frozen "free" liquids of the ALS.

The removal of liquids from substances to form a dried product by controlling air flow rates, temperature and pressure reduced the moisture content of substances assists in inhibiting microbial growth that may cause decay and spoilage. Moisture removal also reduces weight, which is of significant interest and consideration for shipping and transport.

Chemical pretreatment of some substances may further aid the longevity of product shelf life. These pre-treatments may include substances to enhance preservation.

Often dehydration on an industrial scale requires a feed product to be reduced in size and/or particulated to allow enhanced processing characteristics. Freeze drying is the drying of material in a frozen state and preferably the drying stage takes places at an absolute pressure that may readily permit ice to undergo a phase change directly from solid to vapour. In the present invention freeze dried product is preferably substantially undamaged from the drying chamber stage.

In an improved drying process of the first and second aspects, the liquid substance may be atomised in a spray freezer to achieve a particle size of substantially 500 microns or more. Alternatively, the particle size achieved may be less than substantially 500 microns, or even less than substantially 200 microns. Atomisation of the liquid substance is desirable so that the atomised liquid substance may be rapidly reduced in temperature to below its eutectic temperature. Further, atomisation of the liquid substance and subsequent freezing allows for a particulate product to be processed which allows for enhanced drying control and heat transfer characteristics.

The apparatus or spray freezer may be of a counter current configuration, although it may also be of co-current configuration in which the spray freezer can utilise a cold gas to effect a phase change of the liquids in the ALS. The cold gas can effect a phase change causes freezing of liquids within the atomised liquid substance (that is, the ALS is reduced to a temperature below its eutectic temperature). The cold gas utilised by the spray freezer to effect the phase change may be cold air, although any suitable gas to effect a phase change of liquids contained within the ALS may be used.

The cold gas used may be substantially 0° C. or less, even more preferably the cold gas may be less than substantially −20° C.

The ALS once frozen/reduced to below its eutectic temperature can then be conveyed to a separator, and conveying may take place pneumatically. The separator can be a gas-solid separation device, for instance a cyclone.

The gas separated from the cyclone may be returned and/or refrigerated for use in the spray freezer. It can also be recycled to the spray freezer to reduce the cooling load on the evaporator. The evaporator is used to cool the gas which is used to induce a phase change of liquids in the ALS. However, any suitable gas cooling apparatus may be used, with an evaporator being used as an example in this case. Suitable cooling apparatus may include refrigerators, plate heat exchangers, shell and tube heat exchangers and other heat transfer units capable of cooling a gas to a temperature that can be supplied to a spray freezer to force a phase change of liquids in the ALS to the solid (frozen) state.

Preferably one or more vacuum and/or air locks are in place between the frozen ALS cyclone outlet and drying chamber inlet, or some other type of pressure seal device. It is advantageous to provide one or more pressure lock devices for maintenance of the vacuum within the drying chamber. Without the use of these pressure lock devices a suitable vacuum in the drying chamber may not be obtainable. Pressure locks such as valves may be particularly suitable, although any suitable device for sealing the vacuum drying chamber and ensuring the drying chamber maintains its vacuum may be utilised.

In further embodiments there can be a refrigeration system which is employed to maintain the frozen ALS at a temperature below its eutectic temperature during transport from the cyclone to the vacuumous drying chamber. It is advantageous that the frozen ALS remains at a temperature below it eutectic temperature to minimise any product degradation or deterioration that may occur if the ALS rises about its eutectic temperature.

The vacuum of the vacuumous drying chamber is created by a suitable pressure reduction device.

The vacuum created by such suitable pressure reduction devices may be substantially 600 micron meters Hg at select pressure or less. More preferably the vacuum created may be in the range of substantially 200-400 micro meters Hg absolute pressure.

Transport or conveying of the frozen ALS through the vacuum chamber can take place on a vibrating surface, where the vibrating surface is a vibrating tray. The vibrating tray may be pneumatically, electrically and/or via mechanical means driven for provision of the vibration to the tray.

The vibrating tray conveys frozen ALS through a temperature gradient to effect sublimation, with the vapour produced by sublimation being removed from the drying chamber by one or more condensers or such like.

The temperature gradient across the drying tray is provided by an energy source, such as an infrared emitting device. However, the use of other energy sources are envisaged, for example Ohmic heaters and micro-wave devices.

The product produced by an improved drying process and apparatus is substantially free of liquid, otherwise substantially dried or at least substantially reduced in liquid content.

An apparatus for improved drying which facilitates one or more of the following steps of chilling a liquid substance from an initial temperature to a lower temperature, atomising a liquid substance so that a predetermined particle size may be achieved, cooling the atomised liquid substance (ALS) to below its eutectic temperature, conveying the frozen ALS into a drying chamber which may be held under a vacuum, and heating the frozen ALS so as to effect sublimation and freeze drying and then collecting the dried ALS from the drying chamber is desired. In an alternative embodiment the apparatus is defined as an apparatus for an improved drying process which may facilitate one or more of the steps of chilling the liquid substance from an initial temperature, atomising the liquid substance so that a predetermined particle size may be achieved, cooling the atomised liquid substance (ALS) to below its eutectic temperature, conveying the frozen ALS into a drying chamber which is held under a vacuum, conveying the ALS through the drying chamber and, heating the frozen ALS via a temperature gradient while it travels through the drying chamber so that the temperature gradient can effect sublimation and drying whilst preventing or minimising any heat damage occurring to the ALS as it passes through the chamber to a collection point of the dried ALS.

It would be preferable but not necessarily essential that the steps of the process and methodology may be linked to form a continuous process. A continuous process may have a number of advantages.

In addition, a process which is configured to be run on a continuous basis may be preferable as a continuous system tends to be more easily optimised for productivity, higher throughput, reduced processing time per unit produced, improved quality as a result of optimised controls, a generally more efficient process, reduction of human handling and/or contact with substances which may contaminate equipment and/or substances is desirable, and the reduction of human manual labour preferably also reduce the likelihood of injury. Further, continuous processing may allow for equipment designed for an optimised solution for continuous processing and production of freeze dried products.

The vacuum drying chamber is designed to operate at absolute pressures in the range of 200-400 microns of Hg. The vacuumous state of the drying chamber allows for the preferential phase change (sublimation) of the frozen liquids to gas/vapour phase. The sublimation material (vapour) may be preferably removed by the use of a condenser. In a preferred embodiment the drying chamber is run continuously, and may be linked with additional spray freezers, separating devices (cyclones), packaging systems to be run in a batch, semi-continuous or continuous basis.

In a preferred embodiment of the present invention, the frozen ALS may fall onto an inclined pneumatic vibrating tray, (although other vibrating tray systems may be employed) to convey the ALS through a temperature gradient to effect sublimation and discharge of dried product at the end of the drier. The dried product exits through a discharge vacuum lock (which ensures the vacuum is maintained) into further processing stages. For example, further processing stages may include discrete packaging systems.

It is preferable that the surface temperature of the tray is controlled down its length to ensure complete drying without damaging of products.

Drying may be defined as the application of energy under controlled conditions to remove the majority of the water normally present in a substance by evaporation. The main purpose of dehydration is to extend the shelf life of substances by a reduction in water content.

Drying may cause a deterioration in the eating quality and nutritive value of the food. Water plays an important role in the stability of fresh, frozen and dried foods as it acts as a solvent for chemical, microbiological and enzymatic reaction.

A dryer may include a vibrating tray, a pressure reducing means, a material inlet port, a material outlet port, and a heat source. The vibrating tray provides a vibrating surface (upon which sublimation occurs) which conveys frozen ALS from the inlet material port to the outlet material port. The inlet material port is the entry point for frozen ALS into the dryer, and the outlet material port is the exit point of dried ALS (post sublimation).

A heat source is used to induce sublimation of frozen liquids from the frozen ALS along the length of the vibrating tray.

It is therefore advantageous to provide a series of treatment stages in which a liquid substance may be processed and substantially dried or have its liquid content reduced. The steps as described of optionally chilling a liquid substance, atomising the liquid substance, cooling the ALS to initiate a phase change of the liquids within the ALS, optionally separating the phase changed ALS from the cooling gas, conveying the phase changed ALS to a drying chamber, and removal of liquids from the ALS by sublimation may be referred to as a series of treatment stages to provide a substantially reduced liquid/moisture content substance.

However, it is also considered that the pretreatment steps may be foregone and the liquid substance may be Inserted directly to the vacuum chamber (which is held at a vacuum pressure which may be below the triple-point pressure of the liquid substance being processed). This direct Injection may result in the flash evaporation of a portion of the liquid with the remainder of the liquid substance consequently being reduced in temperature such that frozen liquid substance particles result. These frozen particles may then be treated within the drying chamber to induce sublimation of remaining liquid in order to achieve a substantially drier liquid substance.

The pre-treatment stages may be considered to enhance the overall process, although they may be foregone where direct injection of the liquid substance to the vacuum pressure drying chamber is an option.

Those skilled in the art will appreciate, understand and be able to calculate the sizings of pumps, heaters, motors, spray or atomisation nozzles required to achieve the present invention, and it is appreciated that there are numerous variables which will dictate or influence the sizings of these sorts of components. It should also be appreciated that design of a vacuum chamber will be within the realm of a person skilled in the art—however it is the combination and advantages conveyed above that make this Invention suitable.

Aspects of the present invention have been described by way of example only and it should be appreciated that modifications and additions may be made thereto without departing from the scope thereof as defined in the appended claims.

The claims defining the invention are:

1. A method of drying or concentrating a liquid substance having solid particles in suspension or a substance dissolved therein including the steps of:
    holding a chamber at a temperature and pressure below the triple-point of the liquid substance,
    injecting and/or atomizing the liquid substance into the chamber through at least one injection port to generate a frozen liquid substance portion ("FLS portion") having a predetermined particle size and a first evaporated liquid substance portion ("FEL portion"),
    collecting the FLS portion as a layer on a conveying surface,
    conveying the collected FLS portion at a rate which limits the thickness of the FLS portion accumulated on the conveying surface to substantially a monolayer thickness, and
    exposing the collected layer of FLS portion to a heating means thereby inducing sublimation and generation of a second evaporated liquid substance portion ("SEL portion") and a product.

2. A method as claimed in claim 1, wherein the FEL portion is condensed by a condensing device.

3. A method as claimed in claim 1, wherein the FEL portion is removed from said chamber.

4. A method as claimed in claim 1, wherein injecting and/or atomizing the liquid substance includes spraying to achieve the predetermined particle size of the FLS portion.

5. A method as claimed in claim 1, wherein injecting and/or atomizing of the liquid substance is performed by at least one nozzle.

6. A method as claimed in claim 1, wherein the predetermined particle size is substantially 500 μm or more.

7. A method as claimed in claim 1, wherein the predetermined particle size is less than substantially 500 μm.

8. A method as claimed in claim 1, wherein the predetermined particle size is less than substantially 200 µm.

9. A method as claimed in claim 1, wherein the conveying surface conveys the FLS portion away from the at least one injection port.

10. A method as claimed in claim 1, wherein the SEL portion is condensed by a condensing device.

11. A method as claimed in claim 1, wherein the SEL portion is removed from the chamber.

12. A method as claimed in claim 1, wherein the product is removed from the conveying surface by a product removal device.

13. A method as claimed in claim 1, wherein the product is removed from the chamber via an outlet port.

14. A method as claimed in claim 1 where the substance is selected from a group consisting of a slurry of coffee, liquid milk, fruit and vegetable juices and combinations thereof.

15. The method of claim 1, wherein the thickness of the FLS portion is equal to a single layer of the predetermined particle size of the FLS portion.

16. The method of claim 15, wherein the predetermined particle size is substantially 500 µm or more.

17. The method of claim 15, wherein the predetermined particle size is less than substantially 500 µm.

18. The method of claim 15, wherein the predetermined particle size is less than substantially 200 µm.

* * * * *